Inventors
William G. Mears
Karl R. Schmidt
Herman J. vanderStraeten
By Paul H. Heller
Attorney United States Patent Office 3,421,367
Patented Jan. 14, 1969

3,421,367
COMPRESSION TESTING METHOD
AND APPARATUS
William G. Mears, Philadelphia, Pa., and Karl R. Schmidt, Sewell, and Herman J. vander Straeten, Brooklawn, N.J., assignors to Mobil Oil Corporation, a corporation of New York
Filed July 5, 1966, Ser. No. 562,779
U.S. Cl. 73—116      12 Claims
Int. Cl. G01m 15/00

ABSTRACT OF THE DISCLOSURE

The compression pressures in the cylinders of an internal combustion engine are tested by driving the pistons in the cylinders with a starter motor and battery and preventing combustion in the cylinders. Signals representative of electrical load on the battery or of the speed of the engine are generated and displayed to provide an indication of the compression pressure in the cylinders. Reference signals are also generated and displayed to provide an indication of piston position.

---

This invention is directed to a method and means for the diagnosis of a combustion engine system by an analysis of electrical fluctuations in the system. A particular embodiment of this invention is the testing of the compression of the engine's cylinders by an analysis of the starter electrical system when the engine is cranked.

The growth of the automotive industry has created a great demand for improved methods of testing engine conditions. This demand has led to the creation of diagnostic centers which specialize in the analysis of automotive ills. These centers perform a rapid and detailed testing, often by means of sophisticated instruments not normally found in conventional repair shops. A need still exists for thorough analysis techniques which can be performed in a minimum amount of time so that these centers can increase their throughput of vehicles. Preferably, such new techniques should also use equipment that is suitable for conventional repair stations.

A testing procedure which is particularly time-consuming and cumbersome is the compression testing of the cylinders in an automotive engine. There are two conventional devices which perform this type of testing, the compression tester and the cylinder leakage tester. In using each of these instruments, all of the spark plugs must be removed from the engine, and then properly replaced after the testing procedure is completed. Each of these devices rely upon a Bourdon-tube instrument movement. The actuating element is a flattened tube bent into an arc. When pressure is applied to the inside of the tube it tends to straighten out. With one end anchored securely the other moves, and by means of a link operates a pointer on the dial.

The compression tester comprises a gas-tight fitting which is inserted into the spark plug hole and held there tightly. With the starting motor switch closed, the engine is cranked for several compression strokes. The pressure built up inside the cylinder is transmitted through the fitting to the compression gauge in the instrument. The instrument reading provides a record of the compression in the cylinder. This test can be made with the engine cold or at normal operating temperature. The compression tester has a check valve to retain the pressure within the instrument until the reading is made. After the check valve is released, the instrument is ready to test the next cylinder. This procedure is then repeated for each cylinder. Care must be taken to fit the instrument properly into the spark plug hole to prevent leakage. The engine should be cranked the same number of turns in order to obtain a reliable reading for the relative pressure within each of the cylinders.

Similar information can be obtained about engine condition by using a cylinder leakage tester. Pressure from an outside source is used to maintain air pressure in the engine cylinder. A pressure regulator, when properly set, provides a pressure of 60 pounds per square inch from the instrument to the cylinder. A carefully calibrated opening is provided in the instrument so that unobstructed flow of air through the instrument shows 100% pressure loss and no flow shows 0% pressure loss. Unobstructed flow through the instrument, corresponds to no flow through the calibrated opening, and shows that all air is passing through a cylinder leak; when all of the air flows through the calibrated opening it indicates that there is no cylinder leakage. The percentage of leak is indicated on a pressure gauge incorporated in the instrument. To make this test the instrument is connected to the empty spark plug hole with the piston on the compression stroke in top dead center. The reading on the gauge is then noted. For the next cylinder the engine is cranked until the proper piston is in top dead center position. This may be verified by watching the valves (on an overhead valve engine), by connecting a dwell meter and watching the indicated hand for a drop in scale reading when the breaker points open, by attaching an indicating disc to the fan pulley at the end of the crank shaft, or by using a whistle that stops blowing when the piston reaches top dead center on the compression stroke.

The difficulties of the above-described methods are readily apparent. Each of the methods requires the expenditure of a considerable amount of time for removing spark plugs, adjusting the instrument for each of the cylinders, performing the several steps in the testing procedure on each of the cylinders, followed by replacement of the plugs, and making a record of observations.

It is therefore an object of this invention to provide a method and means for the testing of cylinder compression conditions which is both rapid and accurate.

It is a further object of this invention to provide a compression testing procedure which does not require the removal of the spark plugs from the engine nor the attachment of pressure testing instruments to each of the cylinders.

Other objects and advantages of this invention will become apparent from the following description and drawings.

Briefly, this invention comprises measuring the voltage across the battery of a vehicle while the engine is being cranked. As the respective pistons in the engine cylinders approach top dead center, the resistance to piston movement increases and the load upon the vehicle battery will accordingly vary. These variations in the load on the battery are representative of the relative compressions within the engine cylinders. This invention will be defined in greater detail in connection with the following figures.

Figure 1:
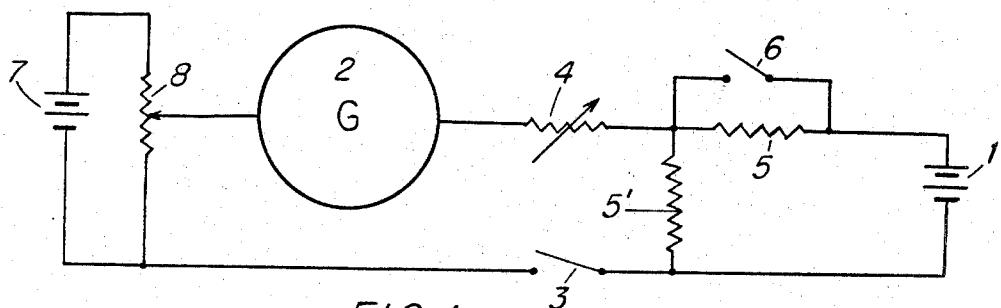
FIGURE 1 is a simplified diagram of a circuit for determining fluctuations in battery voltage.

In determining the voltage fluctuations across the battery which actuates the vehicle's starting motor, it is only necessary to attach a galvanometer which is suitably sensitive to rapid variations of the order of magnitude of a half volt. Similarly current fluctuation in the system can be determined, which also is indicative of cylinder compression. In FIGURE 1 the vehicle battery 1 is shown connected to a galvanometer 2 through a simple on-off switch 3 and variable resistor 4. In order to provide a voltage of approximately the same magnitude for all conventional vehicles, resistors 5 and 5' are used to provide a 6-volt potential drop; for vehicles with a 6-volt electrical system switch 6 is closed and resistor 5 is bypassed. In order to use a galvanometer with a sensitivity over its full scale of from 0–1 or 0–3 volts a regulated D.C. voltage supply 7 and potentiometer 8 are used to provide an opposing potential to the vehicle battery across the galvanometer 2. The variable resistor 4 and potentiometer 8 are used for fine adjustments to initially balance the potential across the galvanometer. Galvanometer 2 preferably represents a complete recording oscillograph system such as a Visicorder, Model 906, by Minneapolis Honeywell. The recording system provides a permanent recording of a signal representative of variations in the battery voltage as a function of time as the engine is cranked.

Figure 2:
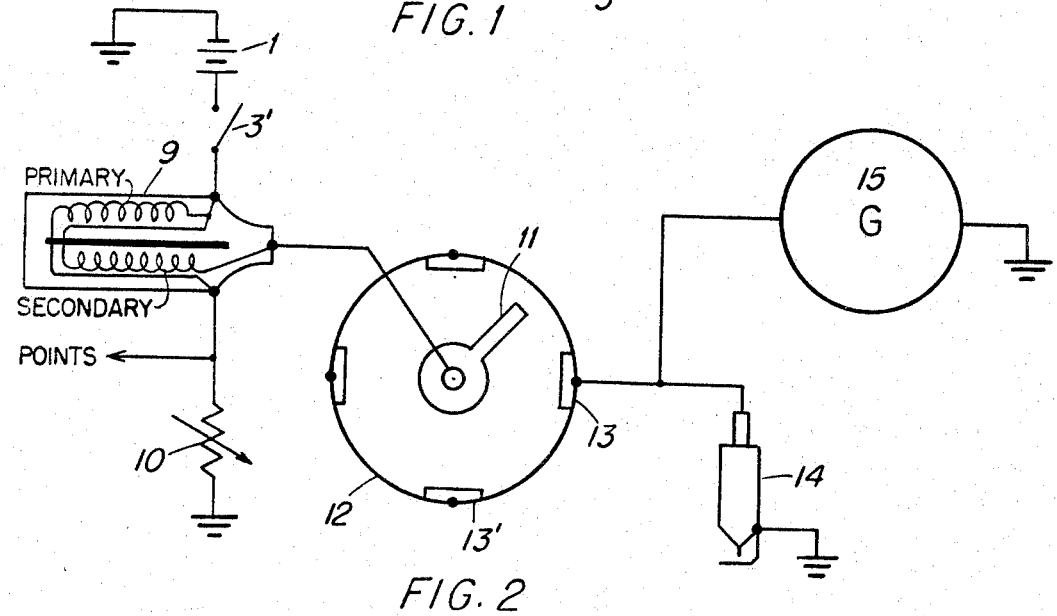
FIGURES 2 and 3 are simplified diagrams of circuits for preventing combustion in the engine and for obtaining reference pulses for use in connection with the apparatus of FIGURE 1.

In connection with the circuit depicted above, it is necessary to provide a means for preventing ignition in the engine cylinders during cranking and also to provide reference pulses to indicate the respective cylinders which correspond to the plot of battery voltage fluctuations. The device of FIGURE 2 provides these functions. A simple means for preventing ignition in the engine cylinders is to reduce the current delivered by the vehicle ignition coil, which is powered by the vehicle battery. In the above figure the vehicle ignition coil 9 is grounded through variable resistor 10. The connection is preferably made at the coil primary winding terminal which is wired to the breaker points. The other terminal of the primary coil is connected through the ignition switch, 3', to the battery 1. With the vehicle engine running, it is then quite simple to merely turn variable resistor 10 to reduce its resistance until the vehicle stalls. At the point at which the vehicle stalls, sufficient voltage is still delivered at the secondary of the ignition coil to rotor 11 of distributor cap 12 in order to bridge the air gap to contact points 13, 13', etc. However, the voltage is insufficient to bridge the gap in the spark plugs, such as 14, and therefore ignition will not occur within the engine cylinders. Galvanometer 15 is connected at one end to contact point 13 or spark plug 14 and is grounded at its other end. This galvanometer will register the coil secondary voltage pulse during every cycle as rotor 11 passes contact point 13. The galvanometer 15 may be part of the Visicorder referred to above and will provide a permanent output signal of voltage as a function of time, synchronized with the signals from galvanometer 2.

Figure 3:
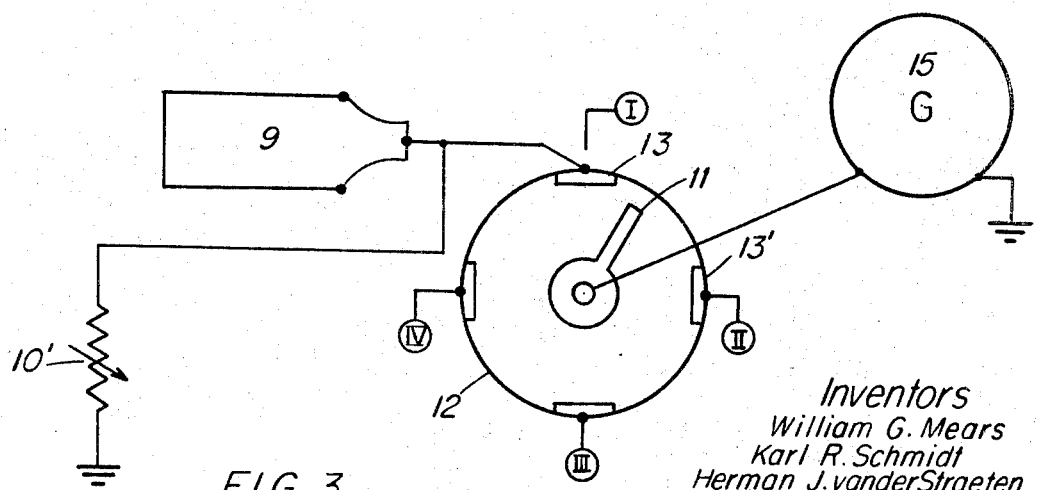

FIGURE 3 is directed to an alternative embodiment for preventing combustion in the cylinders and to provide a reference pulse. The current from coil 9, powered by the vehicle battery, is directed to the contact point 13 for a spark plug, such as I; the plug wire is disconnected to prevent ignition in cylinder I. A pulse pick-up is attached to rotor 11 which provides a reference signal from the coil secondary voltage pulse each time rotor 11 makes an electrical connection with contact point 13. The reference signal actuates galvanometer 15. A simple means to prevent excessive or damaging voltage from being generated in the coil 9, and possible undesirable crossfire of secondary pulses within the distributor cap, is provided by variable resistor 10' connected temporarily between the coil secondary lead and ground. This resistance is adjusted to permit only sufficient electrical energy to reach contact point 13 from rotor 11 when the rotor is aligned with the contact point.

Figure 4A:
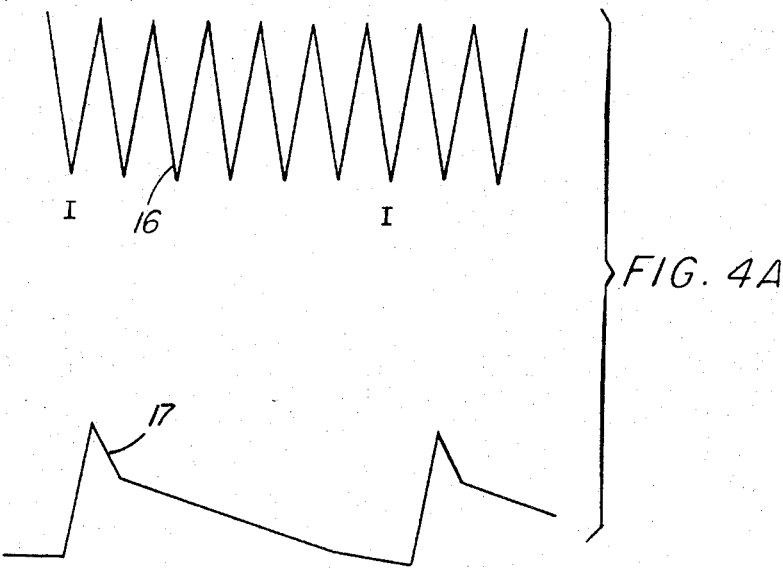
FIGURES 4A and 4B show the output of the apparatus of this invention as a plot of battery voltage and timing pulses (ordinate) as a function of time (abscissa).
Figure 4B:
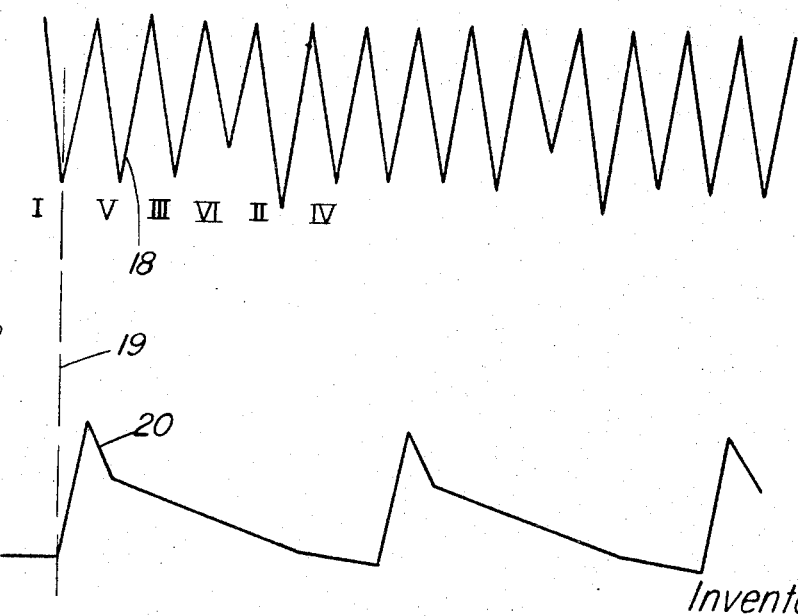

An example of the information obtained by the method and apparatus of this invention is shown in FIGURES 4A and 4B. FIGURE 4A is a plot of the output 16 from galvanometer 2 and the output 17 from galvanometer 15 for an engine with insignificant leakage, measured compression of 165 lbs. FIGURE 4B is a corresponding output from the same vehicle in which a valve in cylinder 6 was maintained slightly open to reduce its pressure to 145 lbs. In FIGURE 4B the battery fluctuations 18 represent the firing sequence for the cylinders I–V–III–VI–II–IV. A line 19 drawn from the output 20 of galvanometer 15 indicates the number 1 cylinder. It is clear from the battery fluctuations that considerably less voltage drop occurred during the compression stroke of the piston in cylinder 6 which, therefore, indicates that the cylinder was leaking. Correspondingly, greater than average energy was required to move the piston in cylinder 2 since that piston movement relies in part upon the release of energy from the compression in cylinder 6. Therefore, the characteristic wave pattern of reduced compression in a cylinder is a reduced drain upon the battery in the compression cycle of the leaky cylinder and an increased drain upon the battery in compressing the air in the following cylinder which receives reduced energy from the expansion of the leaky cylinder.

An alternative embodiment of this invention is to monitor the speed of the engine to determine the relative compression within the cylinders of the engine. A record of the engine speed during cranking has been found to parallel the records of battery voltage and current. The system described and depicted above for monitoring voltage or current fluctuations may readily be modified to determine fluctuations in the speed of the engine. This is accomplished by transmitting the crankshaft rotation to galvanometer movement. For example, in FIGURE 1, the battery 1 would be replaced by a means to transmit a signal representative of engine speed. In such a system the use of resistors 5, 5', 8, battery 7, and switch 6 would be optional, and could readily be varied in accordance with well-known electrical design principles. A conventional system for determining engine speed involves the use of a gear mounted on the crankshaft pulley with one tooth filed down. A pulse pickup #3010–A, manufactured by Electro Products, Chicago, Ill., is mounted over this gear. The pulse generated by the pickup is transmitted to the galvanometer through a Tack-Pak (Model F–54°5–B) manufactured by Airpax Electronics, Inc., Fort Lauderdale, Fla.

In monitoring the speed of the engine the characteristic pattern will be an increase in speed on the compression stroke of a leaking cylinder due to decreased resistance to piston movement, and a decrease in speed on the compression stroke of the next cylinder in the firing order due to reduced assistance and power output from the leaking cylinder.

The invention has been described in terms of specific embodiments set forth in detail, but it should be understood that these are by way of illustration only and that the invention is not necessarily limited thereto. Alternative constructions will become apparent to those skilled in the art in view of this disclosure, and accordingly modifications of the apparatus and process disclosed herein are to be contemplated within the spirit of this invention.

What is claimed is:
1. In a method for testing the relative compression pressures in the cylinders of an internal combustion engine, wherein the pistons in said cylinders may be driven by a starter motor powered by a battery, the steps comprising driving said pistons in said cylinders by means of said starter motor and battery, preventing combustion in said cylinders, generating signals representative of fluctuations in the electrical load on said battery, generating at least one reference signal representative of piston position, and recording said electrical load signals and said reference signal as functions of time, whereby the recordd electrical load signals are indicative of relative compression pressures in the cylinders.

2. In a method for testing the relative compression pressures in the cylinders of an internal combustion engine, wherein the pistons in said cylinders may be driven by a starter motor powered by a battery, the steps comprising driving said pistons in said cylinders by means of said starter motor and battery, preventing combustion in said cylinders, generating signals representative of fluctuations in the electrical load on said battery, generating at least one reference signal representative of piston position, and registering said electrical load signals and said reference signal as functions of time, whereby the registered electrical load signals are indicative of relative compression pressures in the cylinders.

3. In an apparatus for testing the relative compression pressures in the cylinders of an internal combustion engine, wherein the pistons in said cylinders may be driven by a starter motor powered by a battery, the combination comprising means for preventing combustion in the cylinders, means for generating signals representative of fluctuations in the electrical load on the battery, means for generating at least one reference signal representative of piston position, and means for recording said electrical load signals and said reference signal as functions of time, whereby the recorded electrical load signals are indicative of relative compression pressures in the cylinders.

4. The apparatus of claim 3 wherein said engine comprises ignition coil means adapted to be connected to said battery, breaker points connected to said ignition coil means, spark ignition means in each of the cylinders, and distributor means having input means from said ignition coil means and output means to each of the spark ignition means; said reference signal generating means is electrically connected to the output means to one of the spark ignition means; and said means for preventing combustion in the cylinders comprises variable resistor means connected in parallel with said breaker points for reducing the voltage supplied to said distributor means, whereby the voltage developed at the output means for each of the spark ignition means is insufficiently high to cause a spark in each of the spark ignition means and is sufficiently high to be sensed by said reference signal generating means.

5. The apparatus of claim 3 wherein said engine comprises distributor means having a cylindrical distributor cap, a plurality of contact points spaced in a plane about the interior surface of said cap, and rotor means mounted interiorly of said distributor cap, said rotor means having an arm rotatable in said plane and extending to close proximity with said contact points; said means for preventing combustion in the cylinders comprises ignition coil means having an input for connection to said battery and an output connection to one of said contacts, and variable resistor means for electrically connecting said output connection to ground; and said reference signal generating means is electrically connected to said rotor means.

6. In an apparatus for testing the relative compression pressures in the cylinders of an internal combustion engine, wherein the pistons in said cylinders may be driven by a starter motor powered by a battery, the combination comprising means for preventing combustion in the cylinders, means for generating signals representative of fluctuations in the electrical load on the battery, means for generating at least one reference signal representatative of piston position, and means for registering said electrical load signals and said reference signal as functions of time, whereby the registered electrical load signals are indicative of relative compression pressures in the cylinders.

7. The apparatus of claim 6 wherein said engine comprises ignition coil means adapted to be connected to said battery, breaker points connected to said ignition coil means, spark ignition means in each of the cylinders, and distributor means having input means from said ignition coil means and output means to each of the spark ignition means; said reference signal generating means is electrically connected to the output means to one of the spark ignition means; and said means for preventing combustion in the cylinders comprises variable resistor means connected in parallel with said breaker points for reducing the voltage supplied to said distributor means, whereby the voltage developed at the output means for each of the spark ignition means is insufficiently high to cause a spark in each of the spark ignition means and is sufficiently high to be sensed by said reference signal generating means.

8. The apparatus of claim 6 wherein said engine comprises distributor means having a cylindrical distributor cap, a plurality of contact points spaced in a plane about the interior surface of said cap, and rotor means mounted interiorly of said distributor cap, said rotor means having an arm rotatable in said plane and extending to close proximity with said contact points; said means for preventing combustion in the cylinders comprises ignition coil means having an input for connection to said battery and an output connection to one of said contacts and variable resistor means for electrically connecting said output connection to ground; and said reference signal generating means is electrically connected to said rotor means.

9. In a method for testing the relative compression pressures in the cylinders of an internal combustion engine, wherein the pistons in said cylinders are driven by cranking the output shaft of the engine with a starter motor, the steps comprising driving said pistons in said cylinders by means of said starter motor, preventing combustion in said cylinders, monitoring the rotational speed of the output shaft of the engine by means operatively connected to the engine for sensing the rotational speed of the output shaft, generating signals representative of fluctuations in the rotational speed of the output shaft of the engine, and recording said rotational speed signals as a function of time, whereby the recorded rotational speed signals are indicative of relative compression pressures in the cylinders.

10. The method of claim 9 which comprises generating and recording at least one reference signal representative of piston position as a function of time.

11. In a method for testing the relative compression pressures in the cylinders of an internal combustion engine, wherein the pistons in said cylinders are driven by cranking the output shaft of the engine with a starter motor, the steps comprising driving said pistons in said cylinders by means of said starter motor, preventing combustion in said cylinders, monitoring the rotational speed of the output shaft of the engine by means operatively connected to the engine for sensing the rotational speed of the output shaft, generating signals representative of fluctuations in the rotational speed of the output shaft of the engine, and registering said rotational speed signals as a function of time, whereby the registered rotational speed signals are indicative of relative compression pressures in the cylinders.

12. The method of claim 11 which comprises generating and registering at least one reference signal representative of piston position as a function of time.

References Cited

UNITED STATES PATENTS 3,186,218   6/1965   Hollis _____ 73—118 X

OTHER REFERENCES

Vinal, G. W., Storage Batteries, 4th ed., 1955. New York, pp. 423 and 424, QC 605 V54.

Vinal, G. W., et al., Oscillograph Measurements of the Instantaneous Values of Current and Voltage in the Battery Circuit of Automobiles, U.S. Bureau of Standards, Paper No. 186, May 2, 1921, pp. 3–5, 8, and 13–21, QC 1 U51.

RICHARD C. QUEISSER, *Primary Examiner.*

J. W. MYRACLE, *Assistant Examiner.*

U.S. Cl. X.R.

136—182